July 18, 1933.   J. A. FLEISCHLI ET AL   1,918,528
MEANS FOR ASSEMBLING NUTS AND BRIDGE WASHERS ON VALVE STEMS
Filed April 4, 1931   4 Sheets-Sheet 1

INVENTORS:
J. A. FLEISCHLI,
J. M. KOUNTZMAN.
By Albert J. McCauley
ATTORNEY.

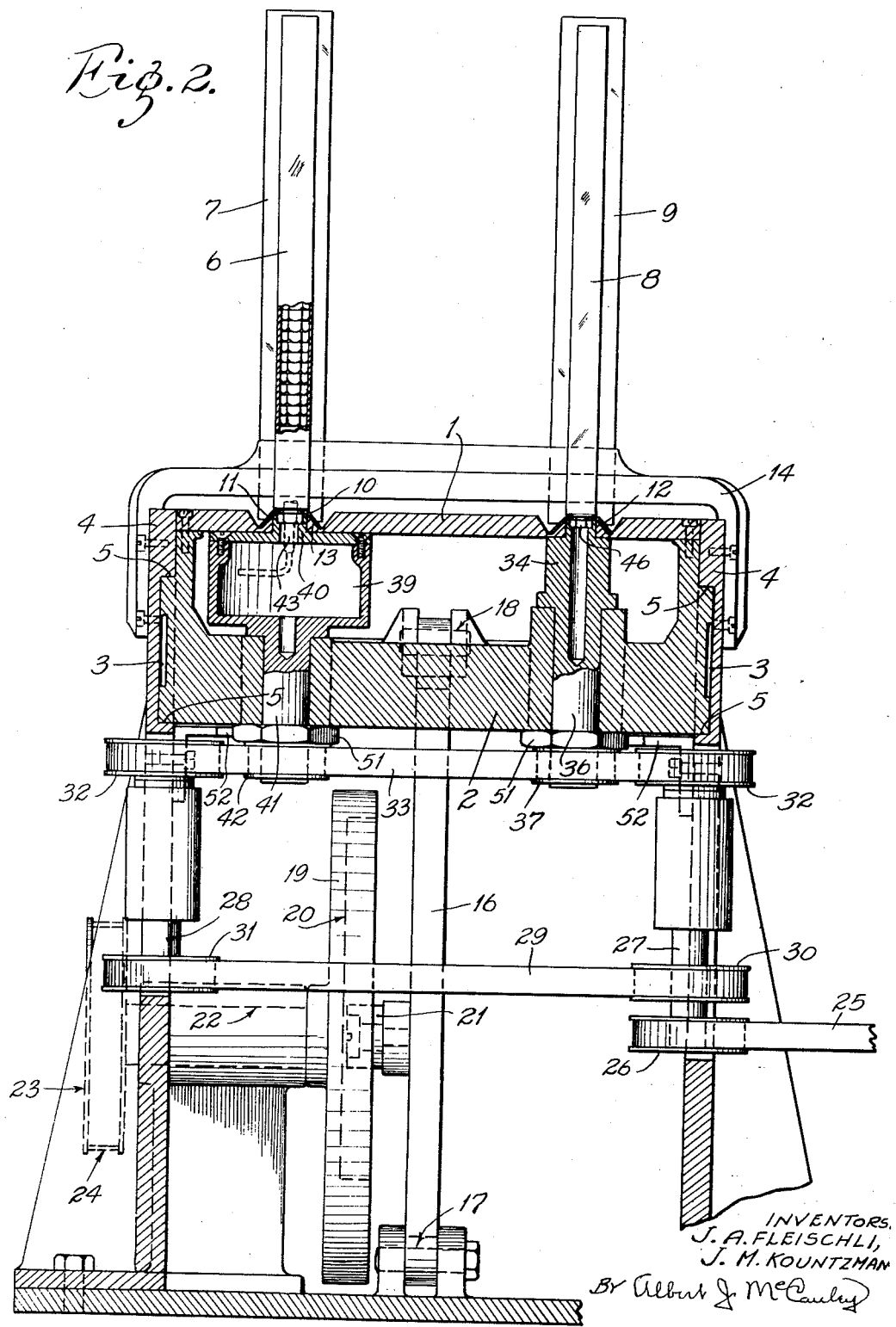

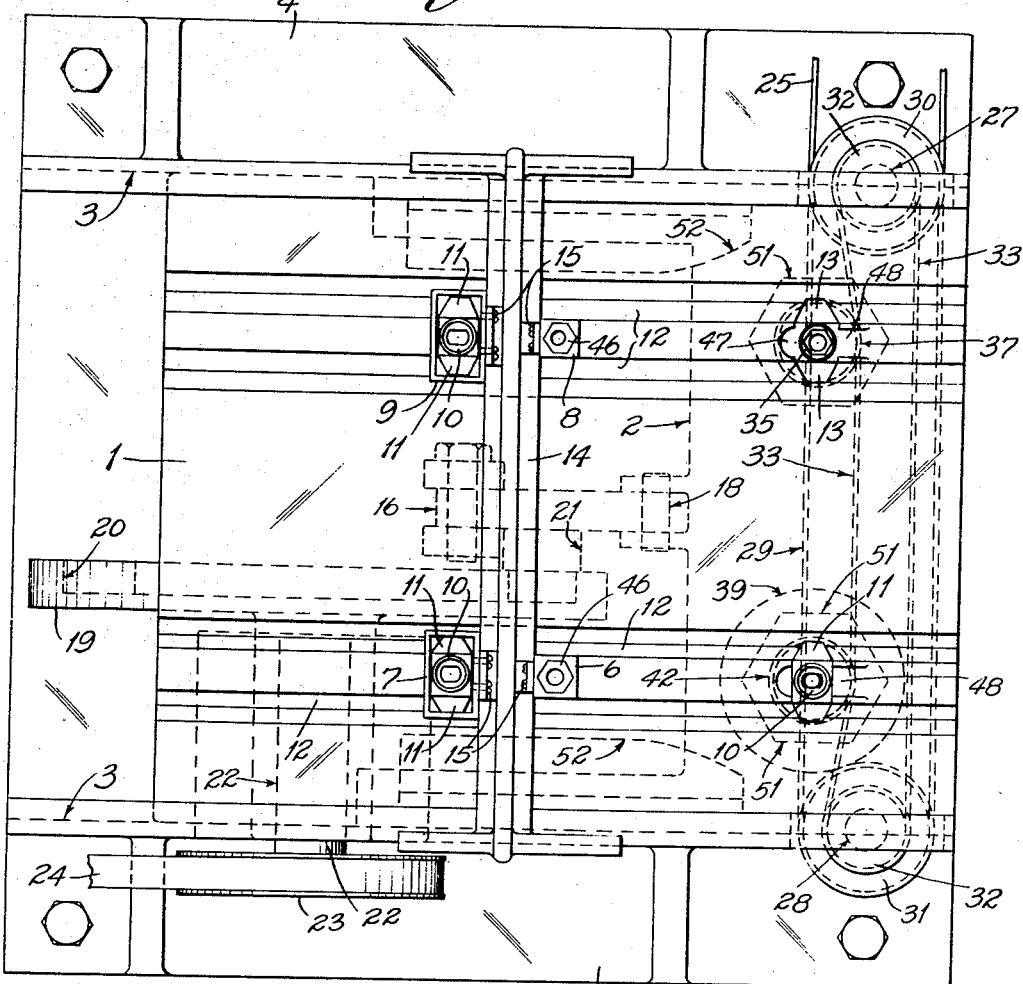
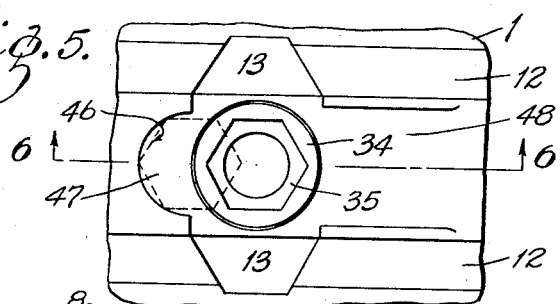
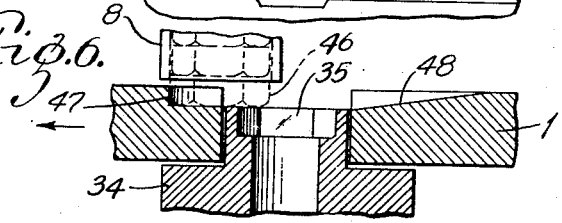
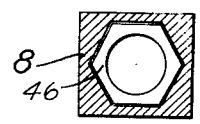

Patented July 18, 1933

1,918,528

UNITED STATES PATENT OFFICE

JOHN A. FLEISCHLI, OF CLAYTON, AND JOSEPH M. KOUNTZMAN, OF ST. LOUIS, MISSOURI, ASSIGNORS TO CUPPLES COMPANY, MANUFACTURERS, OF ST. LOUIS, MISSOURI, A CORPORATION OF MISSOURI

MEANS FOR ASSEMBLING NUTS AND BRIDGE WASHERS ON VALVE STEMS

Application filed April 4, 1931. Serial No. 527,834.

This invention relates to means for assembling nuts and bridge washers on valve stems, such as the valve stems of pneumatic tubes used in tire casings.

One of the objects is to produce a simple and inexpensive means for transferring nuts and bridge washers from magazines to an assembling station where the nut is rotated while a threaded stem is inserted through the nut and bridge washer.

Another object is to provide for the delivery of nuts and bridge washers to valve stems of different shapes and dimensions.

A further object is to produce a device of this kind adapted to receive approximately L-shaped valve stems.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 2 is a vertical section on the line 2—2 in Fig. 1.

Fig. 3 is a top view of the machine.

Fig. 4 is a horizontal section of a magazine, or holder, for a supply of nuts.

Fig. 5 is a top view of a portion of the reciprocating carriage showing seats for a nut and bridge washer.

Fig. 6 is a section on the line 6—6 in Fig. 5, with the addition of the lower portion of the nut magazine.

Figure 1:
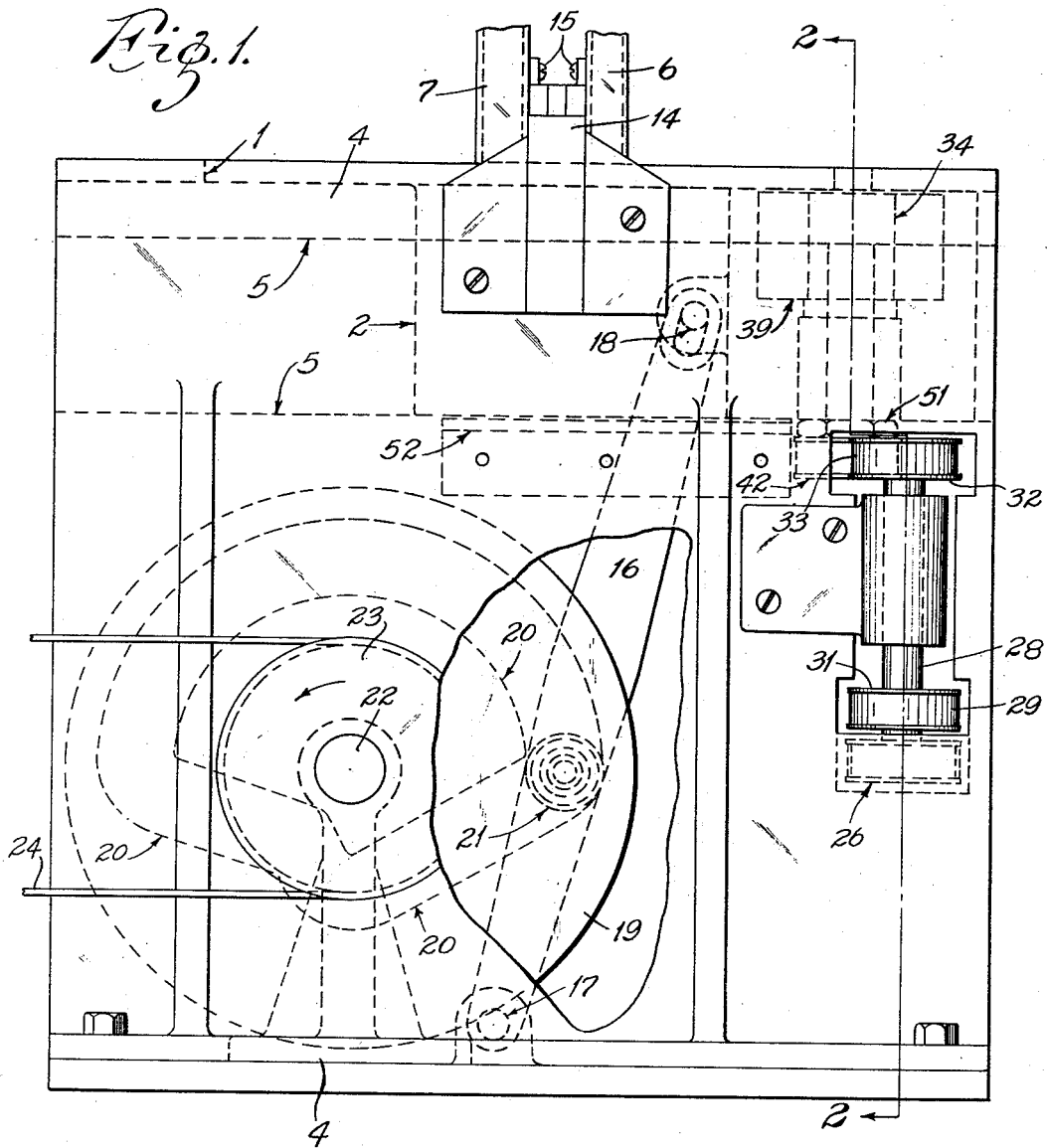
Fig. 1 is a side view of a machine embodying the features of this invention.

We will now describe one form of the invention as shown by the accompanying drawings.

A carriage reciprocates between assembling stations where the parts are assembled and magazines from which the nuts and bridge washers are selected and transferred to the assembling stations.

The reciprocating carriage comprises a table 1 secured to the top of a carrier 2 extending into horizontal recesses 3 formed in stationary side members 4, said recesses having straight horizontal top and bottom faces 5 to guide the carriage.

The magazines for the nuts and bridge washers are arranged in pairs to receive different nuts and washers to be applied to valve stems of different shapes and diameters. One pair of magazines comprises a vertical holder 6 to receive a vertical row of hexagonal nuts, and a vertical holder 7 to receive the corresponding bridge washers.

The other pair of magazines includes a vertical nut-holder 8 and a vertical washer-holder 9, to receive smaller nuts and their bridge washers. The carriage, including the table 1, reciprocates under these holders to transfer the nuts and bridge washers to the assembling stations.

Figure 10:
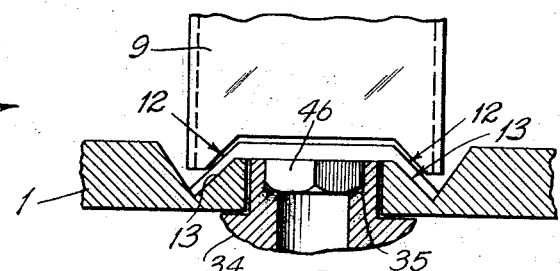
Fig. 10 is a detail view showing the lower portion of the bridge-washer magazine and the depressed seat for the bridge washer, said seat being in the reciprocating carriage. The bridge washers are not shown in this view.

The bridge washers 10 are provided with inclined wings 11, and the reciprocating table 1 has inclined faces 12 to receive said wings. Each inclined face 12 is provided with a depression at 13 (Figs. 5 and 10) to receive one of the inclined wings, and these recessed seats prevent accidental displacement of the bridge washers in the carriage.

The means for supporting the magazines, or holders, 6, 7, 8 and 9 may include a bridge 14 having its ends secured to the stationary side members 4, and screws 15 connecting said bridge to the magazines, as shown in Fig. 1 and Fig. 3.

As an illustration of a suitable means for reciprocating the carriage, we have shown a lever 16, pivoted at 17 (Fig. 1) and having a slot at its upper end to receive a pin 18 on the carrier 2. A cam 19 has a groove 20 to receive a roller 21 on the lever 16, and this cam is secured to a shaft 22 provided with pulley 23 driven from any suitable source of power by means of a belt 24. The cam groove 20 is shaped as shown in Fig. 1 to provide a relatively long "dwell" at the assembling stations hereafter described.

The assembling stations include driving members to rotate the nuts independently of the bridge washers, and these driving members include a belt 25 (Fig. 2) which may be operated from any source of power to drive a pulley 26 on a shaft 27. The companion shaft 28 (Fig. 2) is rotated by a belt 29 extending from a pulley 30 to a pulley 31 on said shaft 28. The upper end of each shaft 27 and 28 is provided with a pulley 32, and a belt 33 connecting said pulleys. A constant and continuous motion is thus imparted to the belt 33.

The assembling stations are thus equipped with a source of power to rotate the nuts.

The reciprocating carriage transfers the nuts and bridge washers to these assembling stations.

Figure 12:
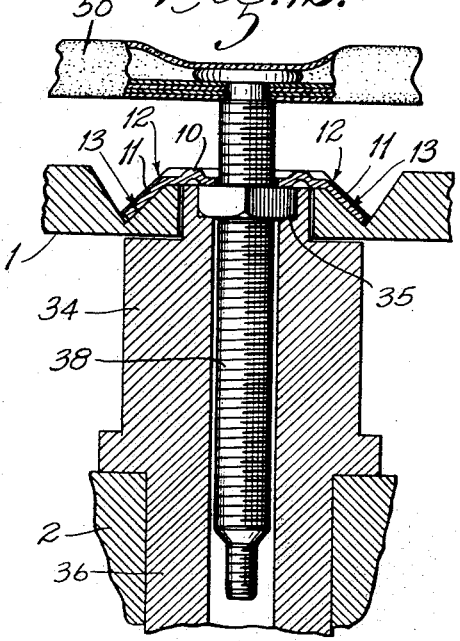
Fig. 12 is a similar view showing how straight valve stems are located at the other assembling station.

This carriage includes a wrench member 34 having a hexagonal socket 35 at the top to receive a hexagonal nut, and this wrench member has a shaft 36 rotatably mounted in the carrier 2 (Fig. 2) and provided with a pulley 37 adapted to engage the constantly moving belt 33. When the pulley 37 contacts with the belt 33 the wrench member 34 is driven to rotate the nut. The valve stem 38 can then be inserted, as shown in Fig. 12, to screw the nut onto the valve stem.

The reciprocating carriage also includes (Fig. 2) a drum 39 connecting a wrench member 40 to a shaft 41 alined with the socket in said wrench member, the lower end of said shaft having a pulley 42 adapted to engage the belt 33.

The wrench member 40 has a passageway 43 extending from its nut-socket 44 to an open space in the interior of the drum 39 which connects the shaft 41 to the wrench member 40. The approximately L-shaped valve stem 45 shown in Fig. 11 can, therefore, be inserted through said socket to locate its lateral extension in the drum 39.

The axis of the driving shaft 41 is alined with the driven wrench member 40, but the side of the drum is offset from this axis to provide the space for the laterally extended portion of the valve stem, as shown in Fig. 2, so the operator can readily insert the L-shaped valve stem, and the nut will be rotated on the threads of said stem, without imparting the rotary motion to the stem.

Figures 6 to 9 inclusive show how the reciprocating carrier can remove the selected nuts and bridge washers from the magazines.

Figure 7:
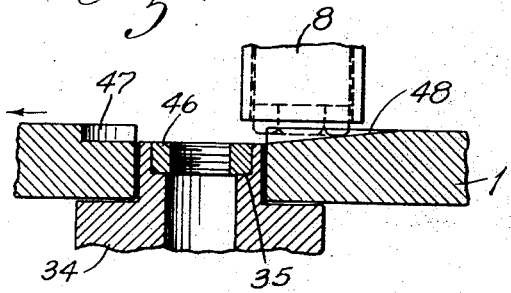
Fig. 7 is a view similar to Fig. 6 showing the carriage advanced to the left, a nut being located in the wrench socket, and the next higher nut at the bottom of the magazine being in contact with an inclined cam which retains it in the magazine.
Figure 8:
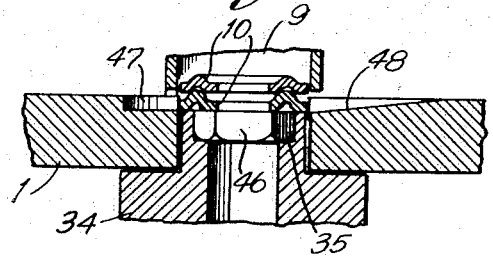
Fig. 8 is a similar view showing the carriage in a further position to the left, so as to receive the lowermost bridge washer from the bridge washer magazine.

As the carrier moves to the left in Fig. 6, the nut 46 drops into a recess 47 in the top of the table 1, and a continued movement to the left causes the nut to fall by gravity into the wrench socket 35, where it lies as shown in Fig. 7. As the movement to the left is continued, a bridge washer 10 is delivered as shown in Fig. 8.

Figure 9:
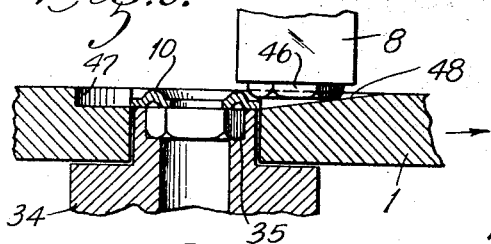
Fig. 9 is a similar view showing how the carriage can return under the nut-magazine.

The carrier then moves to the right as shown in Fig. 9 and it freely passes under the nut magazine. In this connection it will be noted that the top of the table 1 has an inclined cam face 48 which serves as a cam to permit reciprocation under the magazines. The bridge washer 10 in Fig. 9 passes under the nut at the bottom of the magazine 8, and it will be understood that this nut cannot fall into the narrower recess 47 when the bridge washer 10 is located in the moving table as shown in Fig. 9.

When the selected nut and bridge washer arrive at the assembling station, both of the pulleys 37 and 42 engage the constantly moving belt 33, so as to rotate both wrench members 34 and 40. The selected nut in one wrench socket is thus rotated, while the other wrench socket may be idly driven.

Figure 11:
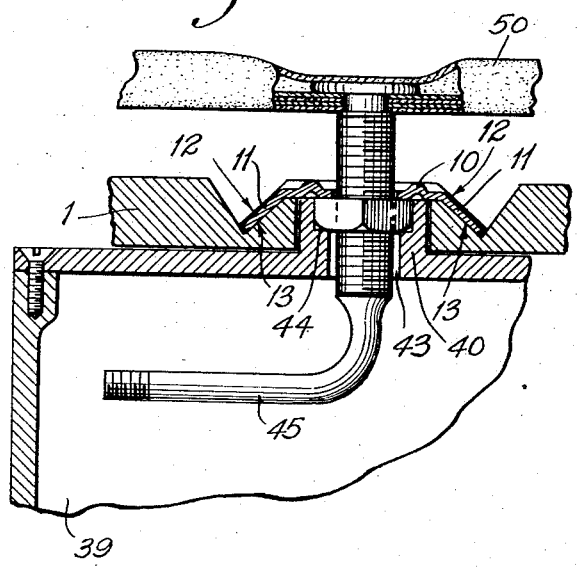
Fig. 11 is a detail view showing how angular valve stems are located at one of the assembling stations.

During the assembling operation, the operator inserts the valve stem 45 or 38, as shown in Figs. 11 and 12. At this time, the operator grasps a portion of the pneumatic tube 50 to which the valve stem is secured in any suitable manner. The operation of inserting the valve stem may be performed by hand while the nut is being rotated at the assembling station, and the valve stem with the assembled nut and bridge washer is then withdrawn from the machine.

To aline the hexagon wrench sockets with the hexagon nuts in the magazines 6 and 8, each of the shafts 36 and 41 (Figs. 2 and 3) is provided with a hexagon member 51 adapted to engage a stationary cam 52. When the carriage moves to the left from the position shown in Fig. 3, each hexagon member 51 contacts with a cam 52 and a straight face of the hexagon slides along a straight face of the cam, thereby holding the hexagon wrench socket in alinement with the hexagon nuts in the magazine, so that the nut will drop into the hexagon socket.

The nut-receiving sockets at the upper ends of the wrench members 34 and 40 may receive nuts of different sizes, as shown in Fig. 2, and while the drum 39 provides the desired space for L-shaped valve stems, it is to be understood that straight valve stems can be inserted into this drum. The shaft 41 immediately below said drum may be provided with a longitudinal bore at the bottom of the drum, as shown in Fig. 2, so as to receive the lower end of a straight valve stem.

We claim:

1. In a means for applying nuts and bridge washers to threaded valve stems, an assembling station where the parts are assembled, said station being provided with driving means to rotate the nuts, and a reciprocating device whereby the nuts and bridge washers are delivered to said assembling station, said reciprocating device including a rotary wrench having a socket to receive the nuts and a recessed seat to receive and prevent rotation of the bridge washers.

2. In a means for applying nuts and bridge washers to threaded valve stems, an assembling station where the parts are assembled, said station being provided with driving means to rotate the nuts, a reciprocating device whereby the nuts and bridge washers are delivered to said assembling station, said reciprocating device including a wrench socket to receive the nuts and a recessed seat to receive and prevent rotation of the bridge washers, and driven means whereby motion is transmitted from said driving means to said wrench socket, said driven means and wrench socket being carried by said reciprocating device.

3. In a means for applying nuts and bridge washers to threaded valve stems, a magazine for the supply of nuts, a magazine for the supply of bridge washers, a carriage provided with a rotary wrench having a socket to receive one of the nuts and a seat for one of the bridge washers, said seat and socket being alined with each other to aline the nut and bridge washer, means whereby said carriage is reciprocated to transfer the nuts and bridge washers from said magazines to said wrench and seat, said wrench and seat being movable with said reciprocating carriage so as to move in opposite directions at the discharge ends of said magazines.

JOHN A. FLEISCHLI.
JOSEPH M. KOUNTZMAN.